US010611488B2

United States Patent
LoPresto et al.

(10) Patent No.: US 10,611,488 B2
(45) Date of Patent: Apr. 7, 2020

(54) ICE ACCRETION BOUNDARY LOCATOR

(71) Applicant: Rosemount Aerospace Inc., Burnsville, MN (US)

(72) Inventors: Vincent R. LoPresto, Eagan, MN (US); Mark Sherwood Miller, Lakeville, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 399 days.

(21) Appl. No.: 15/588,308

(22) Filed: May 5, 2017

(65) Prior Publication Data
US 2018/0319506 A1 Nov. 8, 2018

(51) Int. Cl.
| | |
|---|---|
| *B64D 15/22* | (2006.01) |
| *B64D 15/20* | (2006.01) |
| *B64D 47/02* | (2006.01) |
| *B64D 47/08* | (2006.01) |
| *G01N 21/55* | (2014.01) |
| *B64C 1/14* | (2006.01) |
| *H04N 7/18* | (2006.01) |

(52) U.S. Cl.
CPC ............ *B64D 15/22* (2013.01); *B64C 1/1484* (2013.01); *B64D 15/20* (2013.01); *B64D 47/02* (2013.01); *B64D 47/08* (2013.01); *G01N 21/55* (2013.01); *H04N 7/183* (2013.01)

(58) Field of Classification Search
None
See application file for complete search history.

(56) References Cited

U.S. PATENT DOCUMENTS

| | | | |
|---|---|---|---|
| 5,838,239 A | * 11/1998 | Stern | ...................... B64D 15/20 340/583 |
| 5,841,538 A | 11/1998 | Schoeffler et al. | |
| (Continued) | | | |

FOREIGN PATENT DOCUMENTS

| | | |
|---|---|---|
| EP | 3034338 A1 | 6/2016 |
| WO | WO2011009459 A2 | 1/2011 |

OTHER PUBLICATIONS

Extended European Search Report for EP Application No. 18170267.1, dated Sep. 10, 2018, 8 pages.

*Primary Examiner* — Natalie Huls
*Assistant Examiner* — Jermaine L Jenkins
(74) *Attorney, Agent, or Firm* — Kinney & Lange, P.A.

(57) ABSTRACT

Apparatus and associated methods relate to projecting a light beam onto an interior surface of an aircraft window so as to indicate a testing location to test for ice accretion. The testing location is determined, by a boundary locator, based on aircraft flight conditions, aircraft exterior shape, and a predetermined size of super-cooled droplets, which could present a hazard to the aircraft. The determined test location corresponds to a calculated boundary that separates locations where super-cooled water droplets of the predetermined size cause ice-accretion from locations where such particles do not cause ice accretion, for such aircraft flight conditions. The light beam is then projected onto the interior surface of the aircraft window at the determined test location. The projected beam of light can indicate, to an observer and/or a detector, a location to monitor for ice accretion caused by super-cooled water droplets of the predetermined size.

20 Claims, 7 Drawing Sheets

(56) References Cited

U.S. PATENT DOCUMENTS

| | | | | |
|---|---|---|---|---|
| 6,819,265 B2* | 11/2004 | Jamieson | | B64D 15/20 |
| | | | | 340/962 |
| 7,312,713 B2* | 12/2007 | Alfano | | B64D 15/20 |
| | | | | 250/339.07 |
| 7,986,408 B2* | 7/2011 | Ray | | B64D 15/20 |
| | | | | 356/342 |
| 8,144,325 B2* | 3/2012 | Ray | | B64D 15/20 |
| | | | | 356/342 |
| 8,320,424 B2* | 11/2012 | Bolt | | B23K 26/0643 |
| | | | | 372/55 |
| 8,338,785 B2* | 12/2012 | Ray | | B64D 15/20 |
| | | | | 250/338.1 |
| 8,944,383 B2 | 2/2015 | Bellussi et al. | | |
| 9,096,323 B1* | 8/2015 | Ray | | G02B 27/0006 |
| 9,222,873 B2* | 12/2015 | Baumgardner | | G01N 21/00 |
| 9,409,649 B2 | 8/2016 | Greene et al. | | |
| 10,214,299 B2* | 2/2019 | Jackowski | | G01S 17/42 |
| 2007/0216536 A1 | 9/2007 | Alfano et al. | | |
| 2013/0103316 A1* | 4/2013 | Ray | | G01S 17/95 |
| | | | | 702/3 |
| 2013/0113926 A1 | 5/2013 | Chen et al. | | |
| 2014/0166813 A1 | 6/2014 | Greene et al. | | |
| 2015/0163460 A1 | 6/2015 | Shi et al. | | |

* cited by examiner

ICE ACCRETION BOUNDARY LOCATOR

BACKGROUND

Certain atmospheric conditions can lead to ice formation on aircraft surfaces. Ice formation on aircraft surfaces can increase the weight of the aircraft and can increase the drag of the aircraft. Increasing either the weight or the drag of an aircraft can result in a stall speed that is higher than it would otherwise be in an ice-free condition. Ice formation on lifting surfaces can result in a decrease in a wing's lift and/or a decrease in a propeller's thrust. Ice formation can also affect the controllability of an aircraft by affecting the airflow over control surfaces, such as ailerons.

Various atmospheric conditions can cause more or less ice formation on an aircraft. For example, water droplet density, total moisture content, air temperature, water droplet temperature, droplet size distribution, etc. all factor into risk of ice formation. Some atmospheric conditions can present little or no risk of ice formation on an aircraft.

Various aircraft flying conditions can affect locations and/or amounts of ice formation on aircraft surfaces. For example, airspeed, angle of attack, angle of side-slip, and presence of de-icing equipment all factor into location and/or risk of ice formation.

Some aircraft have been equipped with equipment intended to obtain metrics of the atmosphere so as to predict whether the atmosphere presents a risk of ice-formation on exterior surfaces. Ice formation on aircraft surfaces can be visually perceived by the pilot, should the ice form on a surface within view of the cockpit window.

SUMMARY

Apparatus and associated devices relate to a system for monitoring ice accretion on an aircraft. The system includes a boundary locator and an optical projector. The boundary locator is configured to determine a test location within a projection region of an aircraft window. The determined test location corresponds to a boundary that separates an ice-accretion portion of an exterior surface of the aircraft window and an ice-free portion of the exterior surface of the aircraft window in conditions that include the atmosphere having super-cooled water droplets up to a predetermined size. The optical projector is configured to project a beam of light upon an interior surface of the aircraft window, and to direct the projected beam of light onto the determined test location within the projection region of the interior surface of the aircraft window.

Some embodiments relate to a method for monitoring ice accretion on an aircraft. The method includes determining a test location corresponding to a boundary that separates an ice-accretion portion of an exterior surface of the aircraft window and an ice-free portion of the exterior surface of the aircraft window in conditions that include the atmosphere having super-cooled water droplets up to a corresponding one of a plurality of predetermined sizes. Then a beam of light is projected upon an interior surface of the aircraft window. The projected beam of light is directed onto the determined test location within the projection region of the interior surface of the aircraft window.

DETAILED DESCRIPTION

Apparatus and associated methods relate to projecting a light beam onto an interior surface of an aircraft window so as to indicate a testing location to test for ice accretion. The testing location is determined, by a boundary locator, based on aircraft flight conditions, aircraft exterior shape, and a predetermined size of super-cooled droplets, which could present a hazard to the aircraft. The determined test location corresponds to a calculated boundary that separates locations where super-cooled water droplets of the predetermined size cause ice-accretion from locations where such particles do not cause ice accretion, for such aircraft flight conditions. The light beam is then projected onto the interior surface of the aircraft window at the determined test location. The projected beam of light can indicate, to an observer and/or a detector, a location to monitor for ice accretion caused by super-cooled water droplets of the predetermined size.

Figure 1:
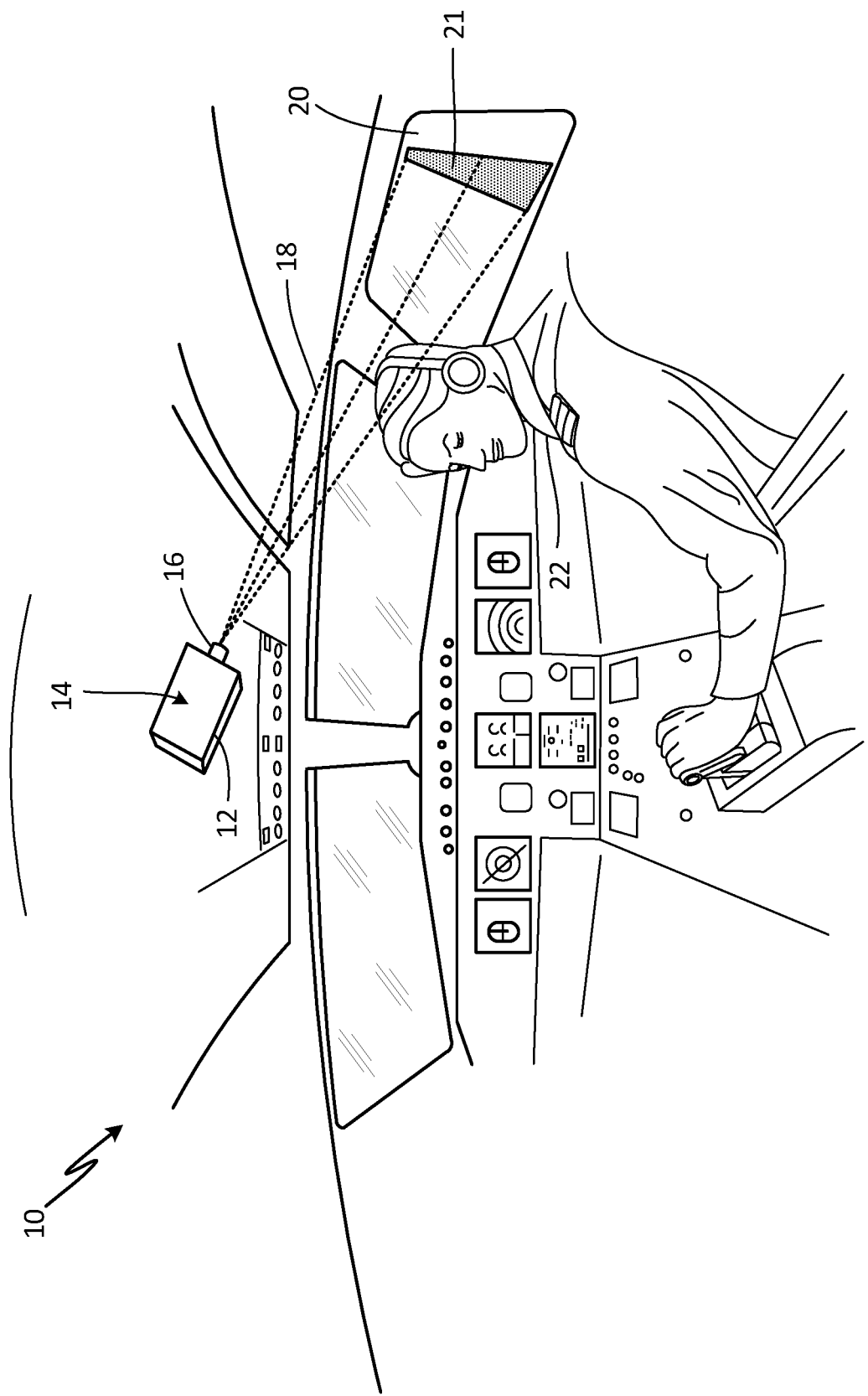
FIG. 1 is a perspective view of an aircraft cockpit equipped with an exemplary ice-accretion monitoring system.

FIG. 1 is a perspective view of an aircraft cockpit equipped with an exemplary ice-accretion monitoring system. In FIG. 1, aircraft cockpit 10 has been equipped with ice-accretion monitoring system 12. Ice-accretion monitoring system 12 includes boundary locator 14 and optical projector 16. In the depicted embodiment, optical projector 16 has been configured to project optical beam 18 upon an interior surface of aircraft window 20. Optical projector 16 directs optical beam 18 at a determined testing location 21 within a testing region of aircraft window 20. Determined testing location 21 corresponds to a boundary that separates an ice-accretion portion of an exterior surface of aircraft window 20 and an ice-free portion of the exterior surface of aircraft window 20 in conditions that include the atmosphere having super-cooled water droplets up to a predetermined maximum size. Boundary locator 14 determines testing location 21, based on such fluid dynamics calculations described below. In some embodiments, pilot 22 can then look at window 20 to determine if ice has accreted at or beyond determined testing location 21. In some embodiments, an optical detector can detect differences in a portion of projected beam 18 that is reflected by aircraft window 20 to determine the presence or absence of ice accretion on the exterior surface of window 20 at testing location 21.

As will be described below, if conditions permit, ice preferentially forms at different locations on these exterior surfaces of an aircraft and of aircraft window 20. Ice tends to form on leading edges of aircraft and is less likely to form as the air moves more and more aft of these leading edges. Ice tends to form increasingly aft of the leading edge as the atmosphere contains super-cooled water droplets of increasing size. The testing region of aircraft window 20 can be selected such that ice will accrete on a portion of testing region if the atmosphere contains super-cooled water droplets of a predetermined size. Various embodiments may use various testing regions of aircraft window 20. In some embodiments, the testing region may be located on a side window of cockpit 10, for example. In some embodiments, the testing region may include a front window of cockpit 10.

In the depicted embodiment, the testing region includes aircraft window 20 of cockpit 10 of the aircraft. In some embodiments, the testing region can also be monitored by an optical detector (not shown). Various types of ice detectors can be used in various embodiments. In some embodiments an ice detector can be a visual light camera. In some embodiments, the ice detector can be an infrared camera, for example. In some embodiments, a series of optical beams may be projected upon the window at a series of determined test locations. Each of the series of projected optical beams can correspond to an ice-accretion boundary of a specific size of super-cooled water droplets. In this way, various test locations can be tested to facilitate determination of a maximum size of super-cooled water droplets in the atmosphere external to the aircraft. In some embodiments, each of the series of projected optical beams can have a different visual index. In some embodiments, each of the projected optical beams may be of a different shape, color, size, etc.

The specific aft boundary location within the testing region of aircraft window 20 that is indicative of an atmosphere having super-cooled water droplets up to the predetermined size can be affected by various conditions. Some such conditions that affect the indicative aft location include: aircraft parameters (e.g., shape of aircraft); flying parameters (e.g., airspeed, angle of attack, etc.); and atmospheric conditions (e.g., temperature, pressure, etc.). Boundary locator 14 calculates the indicative aft location based on one or more of these conditions. Various types of ice boundary calculators can be used in various embodiments. For example, in some embodiments, boundary locator 14 may perform fluid dynamics computations to calculate the indicative aft location. In some embodiments, a look-up table may be used to determine the indicative aft location, for example.

If ice-accretion monitoring system 12 includes an optical detector, the optical detector can be configured to detect ice accretion at the indicative aft location calculated by boundary locator 14 upon which optical beam 18 is projected. An alert system can be configured to generate an alert signal, if ice accretion is detected at the indicative aft location. In various embodiments, various types of alert signals can be generated. For example, in some embodiments an audible alert signal is generated. In some embodiments, an alert signal can be in the form of an electrical signal sent to a display device. For example, a display monitor can present an optical image of the testing region along with a visual and/or flashing alert signal. In some embodiments, an alert signal may be in the form of a signal to another aircraft system. The alert signal can be provided as either a simple alert or with additional information regarding the size of super-cooled water droplets in the atmosphere outside the aircraft.

Figure 2:
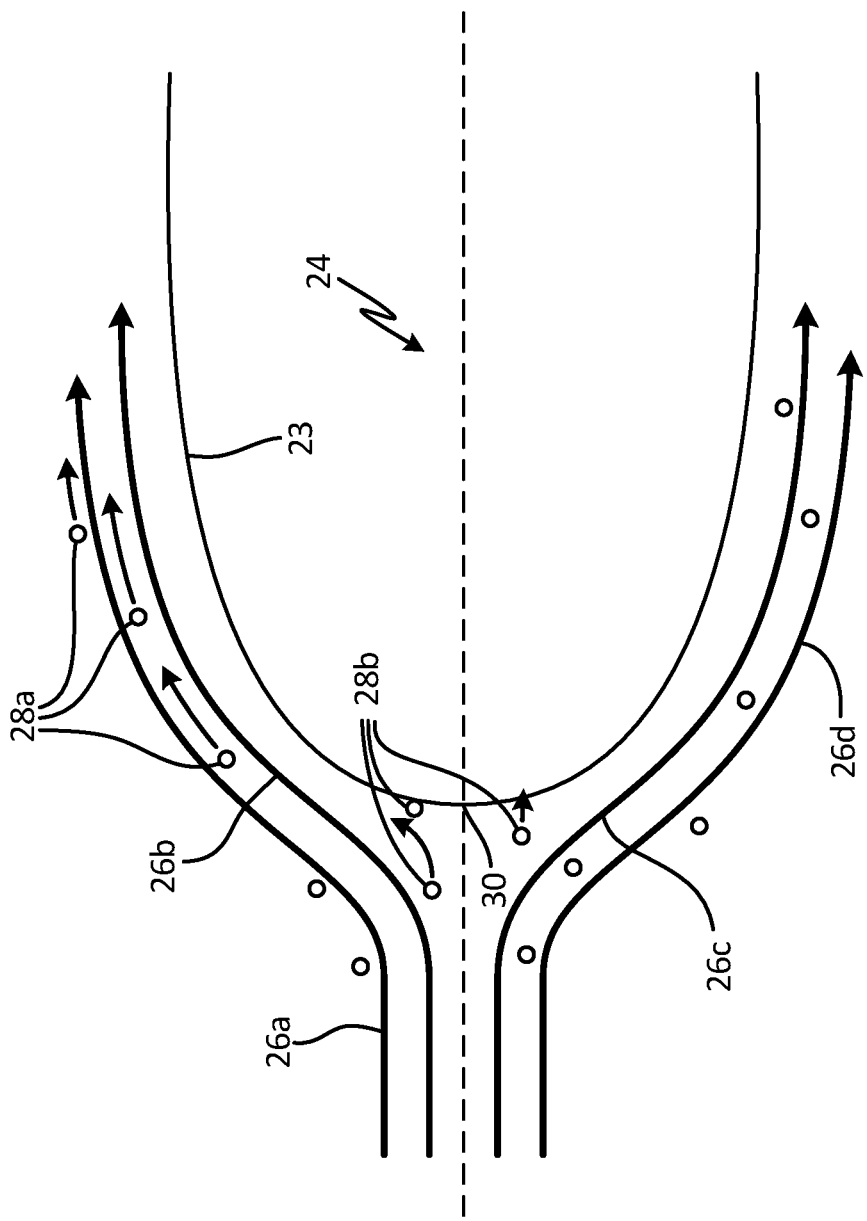
FIG. 2 is a schematic diagram of ice accreting on a leading edge of a curved member in an airstream.

FIG. 2 is a schematic diagram of ice accreting on a leading edge of a curved member in an airstream. In FIG. 2, three-dimensional airfoil 23 is shown in cross section. Although the following description describes ice accretion on an airfoil, the same principles are operative for ice accretion on a convex exterior surface of cabin 10 of an aircraft. Airfoil 23 has flow-dividing axis 24 aligned with a general direction of airflow. Airflow is represented by flow vectors 26a, 26b, 26c, 26d. Water droplets 28a, 28b are carried by the airflow. Small water droplets 28a generally follow the flow vectors, because a mass of the small water droplets 28a is small. A momentum of the small water droplets 28a is correspondingly small, because of the small mass. Because the momentum is small for small water droplets, changing the direction, and thus the momentum, of these small water droplets can be achieved by small forces, such as those imparted by flow vectors 26a, 26b, 26c, 26d. Small water droplets 28a impinge airfoil 23 only proximate flow-dividing axis 24 at leading edge 30.

Large water droplets 28b, however, have momentums that are larger than those of small water droplets 28a, due to larger masses of the large water droplets 26b. Such large water droplets 28b do not follow flow vectors 26a, 26b, 26c, 26d as readily as do small water droplets 28a. Because large water droplets 28b more readily cross flow vectors 26a, 26b, 26c, 26d, such large water droplets 28b impinge airfoil 23 along a greater section of leading edge 30 than is impinged by small water droplets 28a. Large water droplets 28b impinge airfoil 23 proximate flow-dividing axis 24 at leading edge 30 as do small water droplets 28a. Large water droplets 28b also impinge airfoil 23 aft of leading edge 30 for a distance that is related to the droplet size. Airflow does impart a force on large water droplets 28b, and therefore large water droplets 28b do experience momentum change. Because large water droplets 28b can undergo such momentum change, these large water droplets impinge airfoil 23 only over a limited distance from leading edge 30.

If water droplets 28a, 28b are super-cooled (e.g., at temperatures below a freezing temperature of water), then such particles can freeze upon impact with airfoil 23 or another object (e.g., a fuselage, etc.). Pure water can be super-cooled without freezing in the absence of a nucleation site. Such a scenario is not infrequent in cloud atmospheres. The shock of impingement and/or the structural nucleation sites presented by the impinging object can cause such super-cooled water droplets to freeze almost immediately upon such an impingement event.

Figure 3:
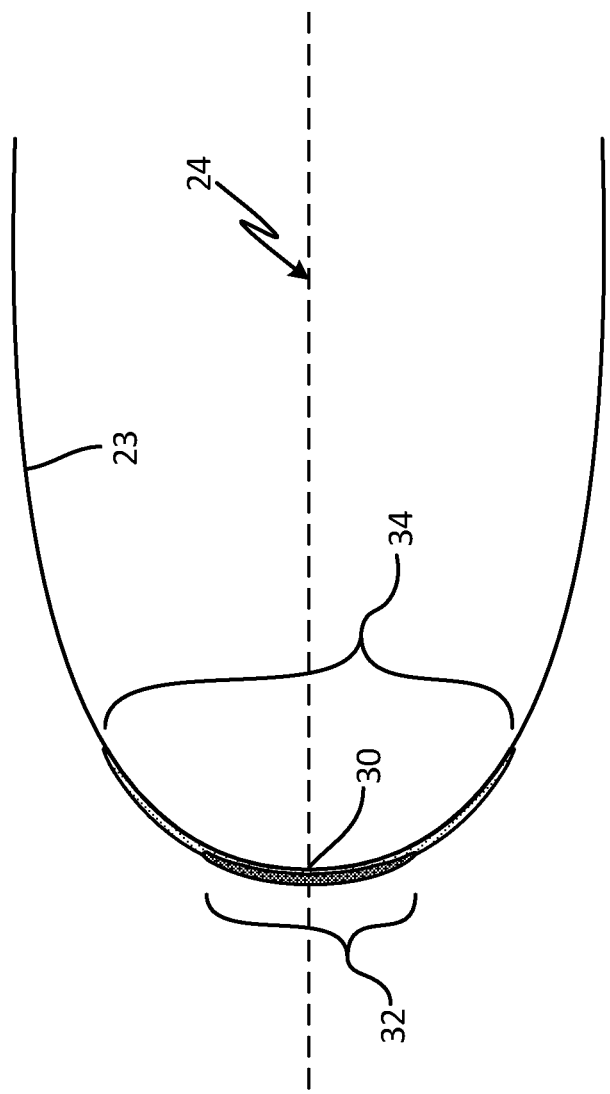
FIG. 3 is a schematic diagram depicting different zones of ice-accretion associated with different sizes of super-cooled water droplets.

FIG. 3 is a schematic diagram depicting different zones of ice-accretion associated with different sizes of super-cooled water droplets. In FIG. 3, airfoil 23 depicted in FIG. 2 is shown in magnification to demonstrate a relationship between water droplet size and impingement region. Two different impingement regions 32, 34 are depicted proximate leading edge 30 of airfoil 23. Impingement region 32 corresponds to small distances from leading edge 30.

Small impingement region 32 is a region in which water droplets, which are less than or equal to a relatively small size (such as small water droplets 28a depicted in FIG. 2), can impinge, for a given set of aircraft and flying conditions. Small water droplets 28a can readily follow flow vectors 26a, 26b, 26c, 26d (depicted in FIG. 2). Flow vectors 26a, 26b show an airflow pattern above airfoil 23, and flow vectors 26c, 26d show an airflow pattern below airfoil 23. Flow vectors 26a, 26b diverge from flow vectors 26c, 26d about central axis 24. Only at locations along leading edge 30 that are proximate central axis 24 can small water droplets 28a impinge airfoil 23. The intersection of leading edge 30 and flow-dividing axis 24 can be called the stagnation point.

Large impingement region 34 includes portions of airfoil 23 which can be impinged only by water droplets that are larger than a predetermined size (such as large water droplets 28b depicted in FIG. 2) for a given set of aircraft and flying conditions. Because larger water droplets 28b can cross flow vectors 26a, 26b, 26c, 26d more readily than can small water droplets 28a, such large water droplets 28b impinge airfoil 23 within a larger region (e.g., large impingement region 34) spanning leading edge 30 than the region (e.g., small impingement region 32) impinged by small water droplets 28a. In this way, FIG. 3 demonstrates a relation that exists between a size of water droplets and a regional area in which such sized water droplets are capable of impingement.

Figure 4:
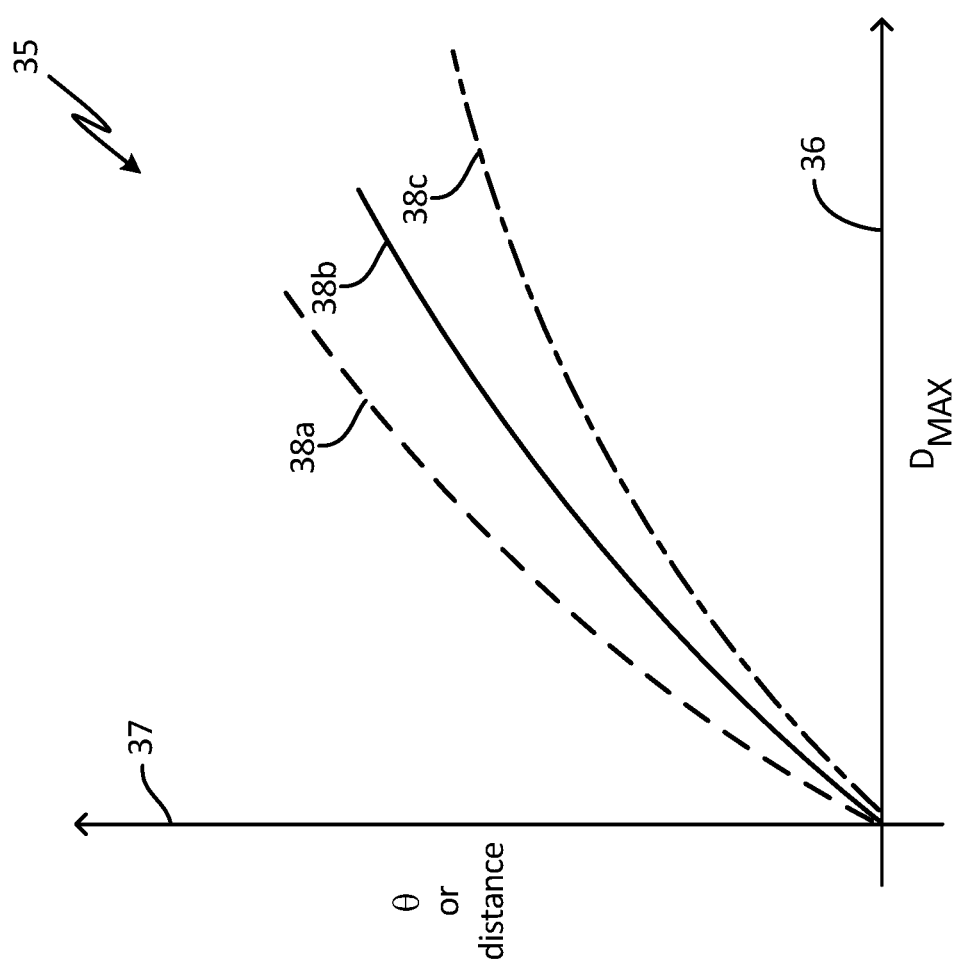
FIG. 4 is a graph of exemplary relations of size of an ice-accretion region versus size of super-cooled water droplets.

FIG. 4 is a graph of exemplary relations of size of an ice-accretion region versus size of super-cooled water droplets. In FIG. 4, graph 35 has horizontal axis 36 and vertical axis 37. Horizontal axis 36 represents maximum size $D_{MAX}$ of water droplets in an atmosphere. Vertical axis 37 represents a distance dimension (e.g., angle θ from stagnation point or chord length d from the stagnation point) of impingement region. Graph 35 has three relations 38a, 38b and 38c. Relation 38a represents a relation between maximum size $D_{MAX}$ of water droplets and distance dimension (e.g., aft distance from leading edge 30) of impingement region where an ice-accretion/ice-free boundary is calculated using a first set of icing conditions. Relations 38b, 38c represent relations between maximum size $D_{MAX}$ of water droplets and distance dimension of impingement region where an ice-accretion/ice-free boundary is calculated for a second and a third set of icing conditions, respectively.

Parameters that affect icing conditions can include aircraft conditions, flying conditions, and atmospheric conditions, for example. Aircraft conditions can include, for example, a shape of a structure to which water droplets impinge, temperature of a surface of the impingement region, aircraft configuration, etc. Flying conditions can include, for example, an angle of attack, an angle of side-slip, an airspeed, etc. Atmospheric conditions can include air temperature, air pressure, water droplet temperature, liquid water content, etc. Various embodiments may be more or less affected by one or more of the icing conditions. For example, some embodiments may be more or less sensitive to angle of attack. A structure that presents substantially the same shape to the airflow independent of angle of attack, for example, may be not very sensitive to angle of attack. Some geometries may be less sensitive to angle of sideslip, for example.

Figure 5:
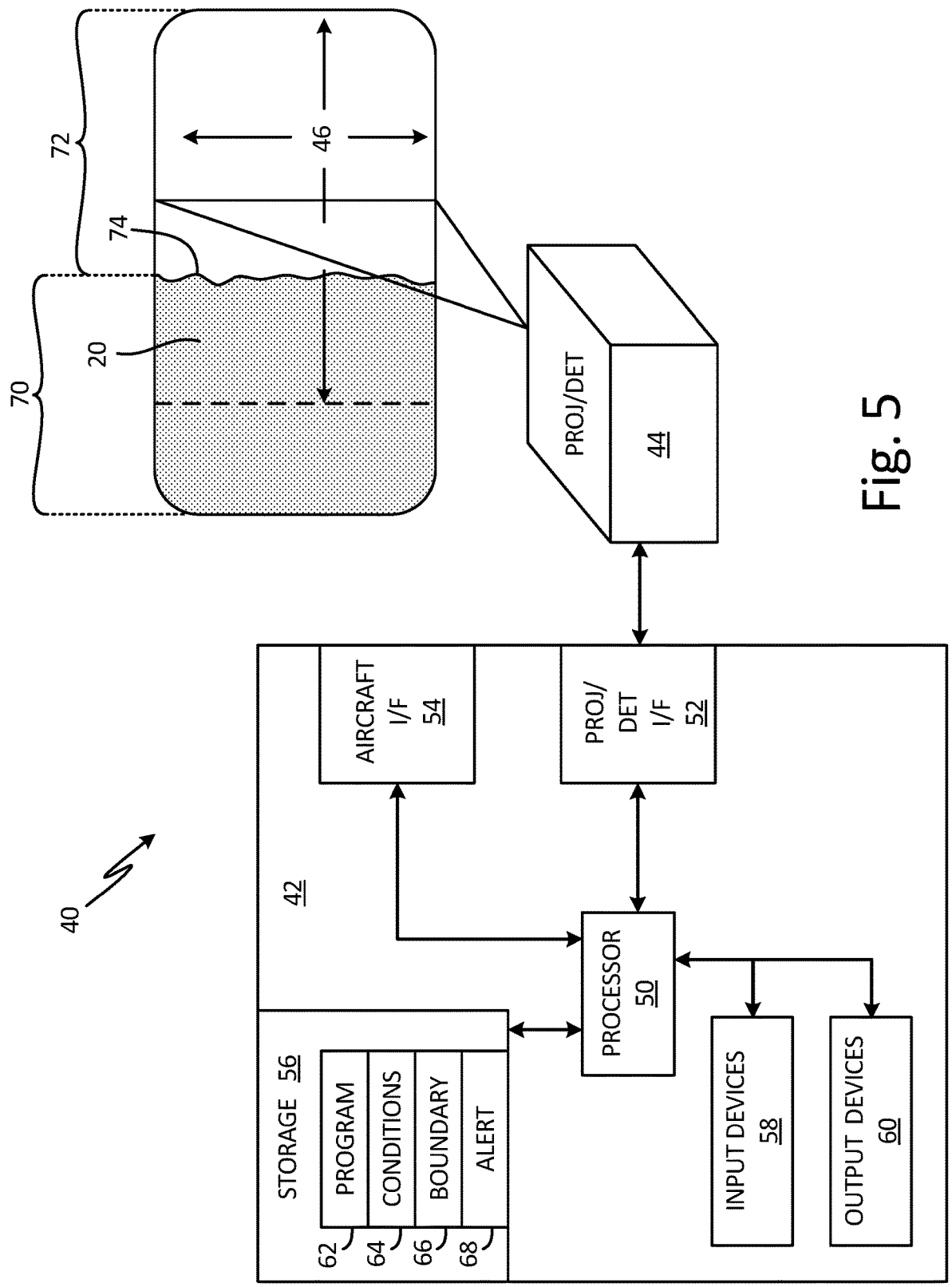
FIG. 5 is a block diagram of an exemplary ice-accretion detection and indicator system.

FIG. 5 is a block diagram of an exemplary ice-accretion detection system. In FIG. 5, ice-accretion detection system 40 includes controller 42, optical projector/detector 44 and testing region 46 of aircraft window 20. Controller 42 includes processor(s) 50, optical projector/detector interface 52, aircraft interface 54, storage device(s) 56, user input devices 58, and user output devices 60. Storage device(s) 56 has various storage or memory locations. Storage device(s) 56 includes program memory 62, conditions data memory 64, boundary calculation module 66, and alert module 68. Controller 42 is in communication with optical projector/detector 44. Optical projector/detector 44 is configured to project the boundary location on the window and monitor ice accretion on testing region 46. Aircraft window 20 is depicted with ice-accretion portion 70 upon which ice has accreted and ice free portion 72 separated by boundary 74.

As illustrated in FIG. 5, controller 42 includes processor(s) 50, optical projector/detector interface 52, aircraft interface 54, storage device(s) 56, user input devices 58, and user output devices 60. However, in certain examples, controller 42 can include more or fewer components. For instance, in examples where controller 42 is an avionics unit, controller 42 may not include user input devices 58 and/or user output devices 60. In some examples, such as where controller 42 is a mobile or portable device such as a laptop computer, controller 42 may include additional components such as a battery that provides power to components of controller 42 during operation.

Processor(s) 50, in one example, is configured to implement functionality and/or process instructions for execution within controller 42. For instance, processor(s) 50 can be capable of processing instructions stored in storage device(s) 56. Examples of processor(s) 50 can include any one or more of a microprocessor, a controller, a digital signal processor (DSP), an application specific integrated circuit (ASIC), a field-programmable gate array (FPGA), or other equivalent discrete or integrated logic circuitry.

Storage device(s) 56 can be configured to store information within controller 42 during operation. Storage device(s) 56, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, storage device(s) 56 is a temporary memory, meaning that a primary purpose of storage device(s) 56 is not long-term storage. Storage device(s) 56, in some examples, is described as volatile memory, meaning that storage device(s) 56 do not maintain stored contents when power to controller 42 is turned off. Examples of volatile memories can include random access memories (RAM), dynamic random access memories (DRAM), static random access memories (SRAM), and other forms of volatile memories. In some examples, storage device(s) 56 is used to store program instructions for execution by processor(s) 50. Storage device(s) 56, in one example, is used by software or applications running on controller 42 (e.g., a software program implementing long-range cloud conditions detection) to temporarily store information during program execution.

Storage device(s) 56, in some examples, also include one or more computer-readable storage media. Storage device(s) 56 can be configured to store larger amounts of information than volatile memory. Storage device(s) 56 can further be configured for long-term storage of information. In some examples, storage device(s) 56 include non-volatile storage elements. Examples of such non-volatile storage elements can include magnetic hard discs, optical discs, flash memories, or forms of electrically programmable memories (EPROM) or electrically erasable and programmable (EEPROM) memories.

Optical projector/detector interface 52, in some examples, includes a communications module. Optical projector/detector interface 52, in one example, utilizes the communications module to communicate with external devices via one or more networks, such as one or more wireless or wired networks or both. The communications module can be a network interface card, such as an Ethernet card, an optical transceiver, a radio frequency transceiver, or any other type of device that can send and receive information. Other examples of such network interfaces can include Bluetooth, 3G, 4G, and Wi-Fi 33 radio computing devices as well as Universal Serial Bus (USB).

Aircraft interface 54 can be used to communicate information between controller 42 and an aircraft. In some embodiments, such information can include aircraft conditions, flying conditions, and/or atmospheric conditions. In some embodiments, such information can include data processed by controller 42, such as, for example, alert signals. Aircraft interface 54 can also include a communications module. Aircraft interface 54, in one example, utilizes the communications module to communicate with external devices via one or more networks, such as one or more wireless or wired networks, or both. The communications module can be a network interface card, such as an Ethernet card, an optical transceiver, a radio frequency transceiver, or any other type of device that can send and receive information. Other examples of such network interfaces can include Bluetooth, 3G, 4G, and Wi-Fi 33 radio computing devices as well as Universal Serial Bus (USB). In some embodiments, communication with the aircraft can be performed via a communications bus, such as, for example, an Aeronautical Radio, Incorporated (ARINC) standard communications protocol. In an exemplary embodiment, aircraft communication with the aircraft can be performed via a communications bus, such as, for example, a Controller Area Network (CAN) bus.

User input devices 58, in some examples, are configured to receive input from a user. Examples of user input devices 58 can include a mouse, a keyboard, a microphone, a camera device, a presence-sensitive and/or touch-sensitive display, push buttons, arrow keys, or other type of device configured to receive input from a user. In some embodiments, input communication from the user can be performed via a communications bus, such as, for example, an Aeronautical Radio, Incorporated (ARINC) standard communications protocol. In an exemplary embodiment, user input communication from the user can be performed via a communications bus, such as, for example, a Controller Area Network (CAN) bus.

User output devices 60 can be configured to provide output to a user. Examples of user output devices 60 can include a display device, a sound card, a video graphics card, a speaker, a cathode ray tube (CRT) monitor, a liquid crystal display (LCD), a light emitting diode (LED) display, an organic light emitting diode (OLED) display, or other type of device for outputting information in a form understandable to users or machines. In some embodiments, output communication to the user can be performed via a communications bus, such as, for example, an Aeronautical Radio, Incorporated (ARINC) standard communications protocol. In an exemplary embodiment, output communication to the user can be performed via a communications bus, such as, for example, a Controller Area Network (CAN) bus.

Figure 6:
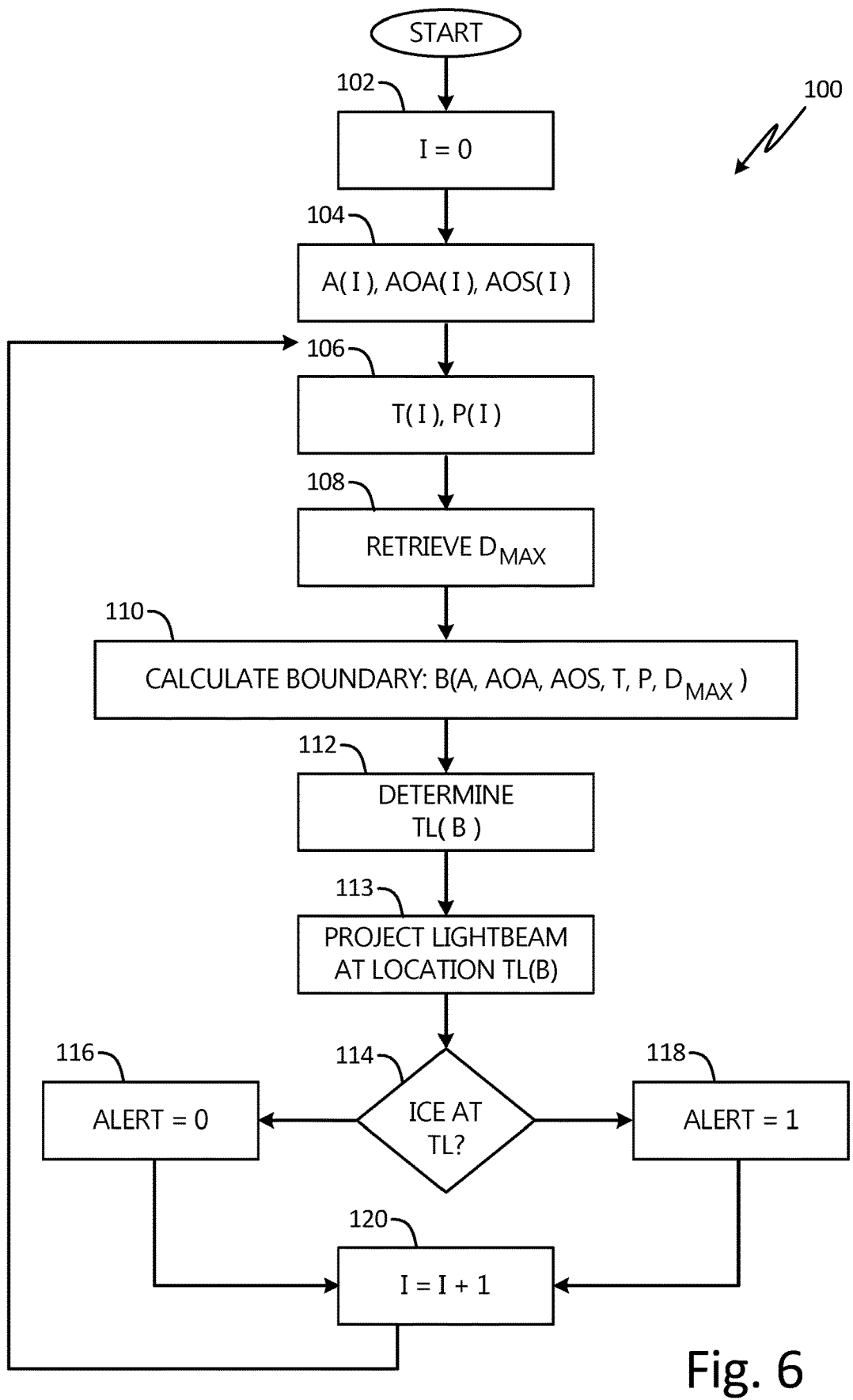
FIG. 6 is a flow chart of an exemplary method for generating an indication of where to observe and providing an alert if the atmosphere exterior to an aircraft has super-cooled water droplets exceeding a predetermined size.

FIG. 6 is a flow chart of an exemplary method for generating an alert if atmosphere exterior to an aircraft has super-cooled water droplets exceeding a predetermined size. In FIG. 6, method 100 is depicted from the vantage point of processor(s) 50 of FIG. 5. Method 100 begins at step 102 where processor(s) 50 initializes index I. Then, at step 104, processor(s) 50 receives, from the aircraft, aircraft conditions including airspeed A(I), angle of attack AOA(I), and angle of side-slip AOS(I). The method then proceeds to step 106 where processor(s) 50 receives, from the aircraft, atmospheric conditions including temperature T(I) and pressure P(I). The method proceeds to step 108 where processor(s) 50 retrieves, from data memory, a maximum water droplet size $D_{MAX}$.

The method then proceeds to step 110 where processor(s) 50 calculates a boundary location B(I) based on the received aircraft conditions, A(I), AOA(I), and AOS(I), the received atmospheric conditions, T(I) and P(I), and the retrieved maximum water droplet size $D_{MAX}$. Then at step 112, processor(s) 50 determines a location TL(I) within a testing region that corresponds to the calculated boundary location B(I). Method 100 proceeds to step 113. At step 113, processor(s) 50 transmits a control signal to optical projector/detector 52. The control signal is configured to cause optical projector/detector 52 to project an optical beam onto the testing region at the determined location TL(I). Then, at step 114, processor(s) 50 receives, from the optical projector/detector 44 (depicted in FIG. 5), a signal indicative of ice formation at the determined location TL(I). Processor(s) 50 evaluates whether ice has formed at the determined location TL(I) based on the received signal. If, at step 114, processor(s) 50 determines that ice has not formed at the determined location TL(I), then at step 116 processor(s) 50 clears the alert signal ALERT. If, however, at step 114, processor(s) 50 determine that ice has formed at the determined location TL(I), then at step 118 processor(s) 50 sets the alert signal ALERT. Method 100 proceeds from steps 116 and/or 118 to step 120, at which processor(s) 50 increments index I. Then, method 100 returns to step 104 and repeats.

In some embodiments, the output of an ice-accretion detection system can determine a maximum super-cooled water-droplet size based on a measured extent of ice formation on an exterior surface of the window. The ice-accretion detection system can provide, as an output, a signal indicative of the determined maximum super-cooled water-droplet size. This output signal may then be used by a receiving system to determine whether an alert signal is generated.

In an exemplary embodiment, a super-cooled water-droplet size distribution of an atmosphere exterior to an aircraft can be calculated. Distinct locations on an exterior surface of a window may be susceptible to ice accretion arising from super-cooled water droplets exceeding a predetermined size striking the distinct location. For example, ice may form at each distinct location, only if the atmosphere external to the aircraft includes super-cooled water droplets that exceed the predetermined size corresponding to that distinct location. By measuring a rate of ice accretion at a plurality of locations along a chord from the stagnation point toward an aft location, a water-droplet size distribution can be calculated.

For example, ice may accrete at a boundary location that separates an ice-accretion region from an ice-free region due to an atmosphere that has super-cooled water-droplets up to a maximum size. Only the super-cooled water droplets that are of the maximum size may cause ice-accretion at the boundary location. And then, at locations more forward from the boundary location, ice may accrete due to super-cooled water-droplets that have sizes that span between a lower threshold and the maximum size. As one travels toward the stagnation point, ice accretes due to a span of sizes of super-cooled water droplets that includes smaller and smaller sizes. By measuring the amount and/or the rate of ice accretion at each of these points, a reconstruction of a super-cooled water-droplet size distribution can be calculated In some embodiments, a heating system is repeatedly used to melt, evaporate, and/or sublimate ice accreted on the testing region. Such a heating system can facilitate testing in conditions in which ice accretion slows or stops due to improving atmospheric conditions. After melting or sublimating any accreted ice from the testing region, the heater may be turned off so that ice may again accrete if conditions permit such accretion. In an exemplary embodiment, the heater can be operated cyclically, such that each cycle has a heating portion, an ice accretion portion, and an ice detection portion. The heater can be activated during the heating portion and deactivated during the ice accretion and ice detection portions. Such an embodiment may repeatedly evaluate ice accretion so as to provide current icing data to a user.

In an exemplary embodiment, a testing region of an interior surface of a window is monitored for ice accretion on the exterior surface of the window. The testing region can be located such that it includes a location upon which ice can accrete only if super-cooled water droplets of a size that exceeds a predetermined testing limit are present. If ice accretes in such a location, then an alert signal may be generated. In some embodiments the testing region will present a convex shape to the atmosphere. In some embodiments, the exterior surface of the aircraft will be intentionally shaped so as to include locations upon which ice can accrete only if super-cooled water droplets of a size that exceeds a predetermined testing limit are present. For example, a bubble may be formed in a side window of a cockpit. The bubble may project out of the side window, for example, to present a convex shape to the outside atmosphere.

Figure 7:
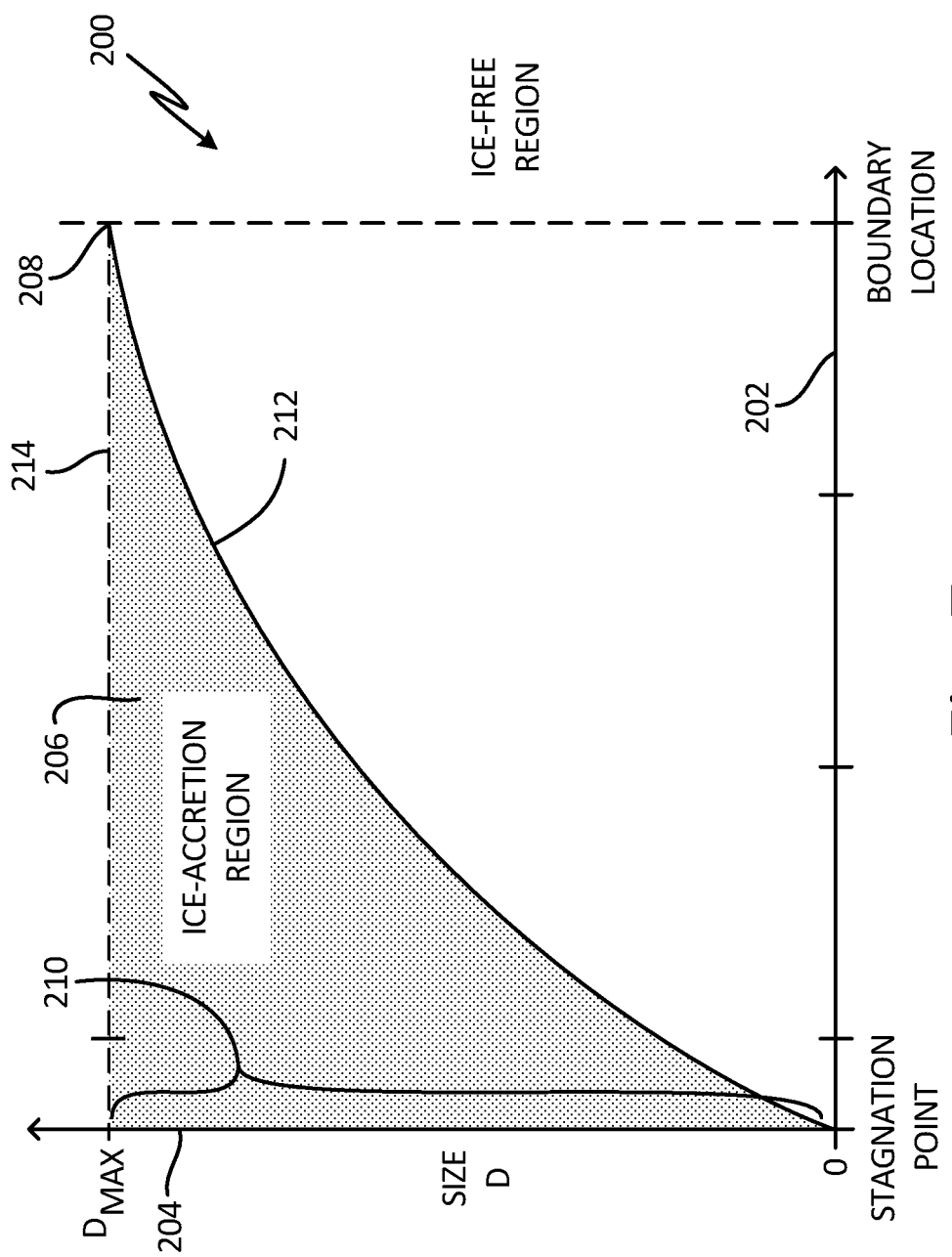
FIG. 7 is a graph depicting a size span of water-droplets vs. location along a chord of a convex-shaped surface of an aircraft.

FIG. 7 is a graph depicting a size span of water-droplets vs. location along a chord of a convex-shaped surface of an aircraft. In FIG. 7, graph 200 has horizontal axis 202 and vertical axis 204. Horizontal axis 202 represents location along a chord of a convex exterior surface exposed to an atmosphere containing super-cooled water droplets. Vertical axis 204 represents a size of the super-cooled water droplets. Graph 200 includes droplet size/location region 206 corresponding to a size of super-cooled droplets that can strike the convex exterior surface at the indicated location. For example, at a given location along the convex-shaped housing (e.g., draw a vertical line from any x-axis location), the exterior surface of the convex-shaped housing will be impinged by droplets exceeding some minimum size up until the maximum sized droplet contained in the cloud atmosphere. Line 212 identifies the relation corresponding to the predetermined minimum size of super-cooled water droplets that contribute to ice accretion vs. location along the chord of the convex shaped housing. Droplets smaller than the minimum size will follow the airflow vectors and will not impinge the convex-shaped housing except at locations near the stagnation point. Dashed line 214 identifies the maximum size of super-cooled water droplets contained in the cloud atmosphere.

For a given size of a super-cooled water droplet (e.g., draw a horizontal line from any y-axis location), the exterior surface of the convex-shaped housing will be impinged for the stagnation point up to a maximum impingement location corresponding to the given size of super-cooled water droplet. Point 208 of relation 206 corresponds to the boundary location separating an ice accretion portion and an ice-free portion of the convex exterior surface for the cloud atmosphere having the maximum size of super-cooled water droplet corresponding to dashed line 214. Not all sizes of particles, however, contribute to ice accretion at every location within the ice accretion portion of the convex exterior surface. At point 208, relation 206 indicates that only super-cooled water droplets equal to the maximum size (or greater if the cloud atmosphere had greater sized particles) accrete at the boundary location. The region to the right of point 208 on graph 200 corresponds to the ice-free portion of the convex exterior surface, and points to the left of point 208 correspond to the ice-accretion portion of the convex exterior surface.

Vertical line 210 of relation 206 corresponds to the stagnation point of the convex exterior surface. At the stagnation point corresponding to vertical line 210, super-cooled water droplets of all sizes within the atmosphere contribute to ice accretion. Between point 208 and vertical line 210, super-cooled water droplets that have a size greater than a predetermined minimum will contribute to ice accretion. Super-cooled water droplets smaller than the predetermined minimum size will follow the flow vector lines and not impinge the convex exterior surface, and therefore will not contribute to ice accretion. Line 212 identifies the relation corresponding to the predetermined minimum size of super-cooled water droplets that contribute to ice accretion vs. location along the chord of the convex shaped housing.

The following are non-exclusive descriptions of possible embodiments of the present invention.

Apparatus and associated methods relate to a system for monitoring ice accretion on an aircraft. The system includes a boundary locator configured to determine a test location within a projection region of an aircraft window. The determined test location corresponds to a boundary that separates an ice-accretion portion of an exterior surface of the aircraft window and an ice-free portion of the exterior surface of the aircraft window in conditions that include the atmosphere having super-cooled water droplets up to a predetermined size. The system also includes an optical projector configured to project a beam of light upon an interior surface of the aircraft window, and to direct the projected beam of light onto the determined test location within the projection region of the interior surface of the aircraft window.

The system of the preceding paragraph can optionally include, additionally and/or alternatively, any one or more of the following features, configurations and/or additional components:

A further embodiment of the foregoing system, further including an optical detector configured to detect a portion of the projected beam of light reflected by the aircraft window and to compare the detected portion of the projected beam of light reflected by the aircraft window with a predetermined threshold.

A further embodiment of any of the foregoing systems, wherein the optical detector can include a camera configured to obtain images of the aircraft window.

A further embodiment of any of the foregoing systems can further include an alert system configured to generate, in response to the detected portion of the projected beam of light reflected by the aircraft window exceeding the predetermined threshold, an alert.

A further embodiment of any of the foregoing systems, wherein the aircraft window can have a convex exterior surface.

A further embodiment of any of the foregoing systems, wherein the optical projector can be configured to be mounted in a cockpit of the aircraft and the aircraft window onto which the optical projector is configured to project the beam of light is a side window of the cockpit of the aircraft.

A further embodiment of any of the foregoing systems, wherein the boundary locator is further configured to determine a plurality of test locations within the projection region of the aircraft window. Each of the determined test locations corresponds to one of plurality of boundaries that separate the ice-accretion portion of the exterior surface of the aircraft window and the ice-free portion of the exterior surface of the aircraft window in conditions that include the atmosphere having super-cooled water droplets up to a corresponding one of a plurality of sizes. The projector can be further configured to project a plurality of beams of light upon an interior surface of the aircraft window, and to direct each of the projected plurality of beams of light onto a corresponding one of the determined plurality of test locations within the projection region of the interior surface of the aircraft window.

A further embodiment of any of the foregoing systems, wherein each of plurality of beams of light can have a visual index indicative of the corresponding one of the plurality of sizes.

A further embodiment of any of the foregoing systems can further include a heater configured to heat the aircraft window so as to melt, evaporate, and/or sublimate any ice accreted thereto.

A further embodiment of any of the foregoing systems, wherein the super-cooled water-droplet size measurement system can be configured to provide cycles of operation that include a heating portion, an accretion portion, and a sensing portion of each of the provided cycles. The heater can be activated during the heating portion, and the heater can be deactivated during the accretion and sensing portions.

A further embodiment of any of the foregoing systems, wherein the test location can be determined by calculating the test location using computational fluid dynamics.

A further embodiment of any of the foregoing systems, wherein the test location can be determined based at least in part on aircraft flight conditions, and aircraft cockpit shape.

A further embodiment of any of the foregoing systems, wherein the test location can be determined by the boundary locator based on at least one of: an angle of attack; angle of sideslip; airspeed, and total air temperature.

Some embodiments relate to a method for monitoring ice accretion on an aircraft. The method includes determining a test location corresponding to a boundary that separates an ice-accretion portion of an exterior surface of the aircraft window and an ice-free portion of the exterior surface of the aircraft window in conditions that include the atmosphere having super-cooled water droplets up to a corresponding one of a plurality of predetermined sizes. The method includes projecting a beam of light upon an interior surface of the aircraft window. The method also includes directing the projected beam of light onto the determined test location within the projection region of the interior surface of the aircraft window.

The method of the preceding paragraph can optionally include, additionally and/or alternatively, any one or more of the following features, configurations and/or additional components:

A further embodiment of the foregoing method, wherein determining the test location within the aircraft window can include calculating the test location using computational fluid dynamics.

A further embodiment of any of the foregoing methods, wherein determining the test location within the aircraft window can include determining the test location based at least in part on aircraft flight conditions, aircraft cockpit shape.

A further embodiment of any of the foregoing methods, wherein determining the test location within the aircraft window can include calculating the test location based on at least one of: airspeed; angle of attack; angle of sideslip; and total air temperature.

A further embodiment of any of the foregoing methods can further include detecting a portion of the projected beam of light reflected by the aircraft window. A further embodiment of any of the foregoing methods can further include comparing the detected portion of the projected beam the aircraft window with a predetermined threshold.

A further embodiment of any of the foregoing methods can further include determining a test location corresponding to a boundary that separates an ice-accretion portion of an exterior surface of the aircraft window and an ice-free portion of the exterior surface of the aircraft window in conditions that include the atmosphere having super-cooled water droplets up to a predetermined size. A further embodiment of any of the foregoing methods can further include projecting a plurality of beams of light upon the interior surface of the aircraft window. A further embodiment of any of the foregoing methods can further include directing each of the projected plurality of beams of light onto a corresponding one of the plurality of determined test locations within the projection region of the interior surface of the aircraft window.

A further embodiment of any of the foregoing methods, wherein each of the plurality of the projected beams of light can have a visual index indicative of a corresponding one of the plurality of predetermined sizes of super-cooled water droplets.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system for monitoring ice accretion on an aircraft, the system comprising:
   a boundary locator configured to determine a test location within a projection region of an aircraft window, the determined test location corresponding to a boundary that separates an ice-accretion portion of an exterior surface of the aircraft window and an ice-free portion of the exterior surface of the aircraft window in conditions that include the atmosphere having super-cooled water droplets up to a predetermined size; and
   an optical projector configured to project a beam of light upon an interior surface of the aircraft window, and to direct the projected beam of light onto the determined test location within the projection region of the interior surface of the aircraft window.

2. The system of claim 1, further comprising:
   an optical detector configured to detect a portion of the projected beam of light reflected by the aircraft window and to compare the detected portion of the projected beam of light reflected by the aircraft window with a predetermined threshold.

3. The system of claim 2, wherein the optical detector comprises a camera configured to obtain images of the aircraft window.

4. The system of claim 2, further comprising an alert system configured to generate, in response to the detected portion of the projected beam of light reflected by the aircraft window exceeding the predetermined threshold, an alert.

5. The system of claim 1, wherein the aircraft window has a convex exterior surface.

6. The system of claim 1, wherein the optical projector is configure to be mounted in a cockpit of the aircraft and the aircraft window onto which the optical projector is configured to project the beam of light is a side window of the cockpit of the aircraft.

7. The system of claim 1, wherein the boundary locator is further configured to:
  determine a plurality of test locations within the projection region of the aircraft window, each of the determined test locations corresponding to one of plurality of boundaries that separate the ice-accretion portion of the exterior surface of the aircraft window and the ice-free portion of the exterior surface of the aircraft window in conditions that include the atmosphere having super-cooled water droplets up to a corresponding one of a plurality of sizes; and
  wherein projector is further configured to project a plurality of beams of light upon an interior surface of the aircraft window, and to direct each of the projected plurality of beams of light onto a corresponding one of the determined plurality of test locations within the projection region of the interior surface of the aircraft window.

8. The system of claim 7, wherein each of plurality of beams of light has a visual index indicative of the corresponding one of the plurality of sizes.

9. The system of claim 1, further comprising a heater configured to heat the aircraft window so as to melt, evaporate, and/or sublimate any ice accreted thereto.

10. The system of claim 9, wherein the super-cooled water-droplet size measurement system is configured to provide cycles of operation that include a heating portion, an accretion portion and a sensing portion of each of the provided cycles, wherein the heater is activated during the heating portion, and the heater is deactivated during the accretion and sensing portions.

11. The system of claim 1, wherein the test location is determined by calculating the test location using computational fluid dynamics.

12. The system of claim 1, wherein the test location is determined based at least in part on aircraft flight conditions, and aircraft cockpit shape.

13. The system of claim 1, wherein the test location is determined by the boundary locator based on at least one of: an angle of attack; angle of sideslip; airspeed, and total air temperature.

14. A method for monitoring ice accretion on an aircraft, the method comprising:
  determining a test location corresponding to a boundary that separates an ice-accretion portion of an exterior surface of the aircraft window and an ice-free portion of the exterior surface of the aircraft window in conditions that include the atmosphere having super-cooled water droplets up to a corresponding one of a plurality of predetermined sizes;
  projecting a beam of light upon an interior surface of the aircraft window; and
  directing the projected beam of light onto the determined test location within the projection region of the interior surface of the aircraft window.

15. The method of claim 14, wherein determining the test location within the aircraft window comprises:
  calculating the test location using computational fluid dynamics.

16. The method of claim 14, wherein determining the test location within the aircraft window comprises:
  determining the test location based at least in part on aircraft flight conditions, aircraft cockpit shape.

17. The method of claim 14, wherein determining the test location within the aircraft window comprises:
  calculating the test location based on at least one of:
    airspeed; angle of attack;
    angle of sideslip; and total air temperature.

18. The method of claim 14, further comprising:
  detecting a portion of the projected beam of light reflected by the aircraft window; and
  comparing the detected portion of the projected beam the aircraft window with a predetermined threshold.

19. The method of claim 14, further comprising:
  determining a test location corresponding to a boundary that separates an ice-accretion portion of an exterior surface of the aircraft window and an ice-free portion of the exterior surface of the aircraft window in conditions that include the atmosphere having super-cooled water droplets up to a predetermined size;
  projecting a plurality of beams of light upon the interior surface of the aircraft window; and
  directing each of the projected plurality of beams of light onto a corresponding one of the plurality of determined test locations within the projection region of the interior surface of the aircraft window.

20. The method of claim 19, wherein each of the plurality of the projected beams of light has a visual index indicative of a corresponding one of the plurality of predetermined sizes of super-cooled water droplets.

* * * * *